(No Model.)

M. H. LANE.
ROAD CART.

No. 346,555. Patented Aug. 3, 1886.

Witnesses.
John C. Perkins
Eugene C. Southard

Inventor.
M Henry Lane
Per Lucius C. West
Atty.

UNITED STATES PATENT OFFICE.

M. HENRY LANE, OF KALAMAZOO, MICHIGAN.

ROAD-CART.

SPECIFICATION forming part of Letters Patent No. 346,555, dated August 3, 1886.

Application filed December 24, 1885. Serial No. 186,618. (No model.)

*To all whom it may concern:*

Be it known that I, M. HENRY LANE, a citizen of the United States, residing at Kalamazoo, county of Kalamazoo, State of Michigan, have invented a new and useful Road-Cart, of which the following is a specification.

This invention has for its object certain improvements in this class of vehicles, below described and claimed.

Figure 1:
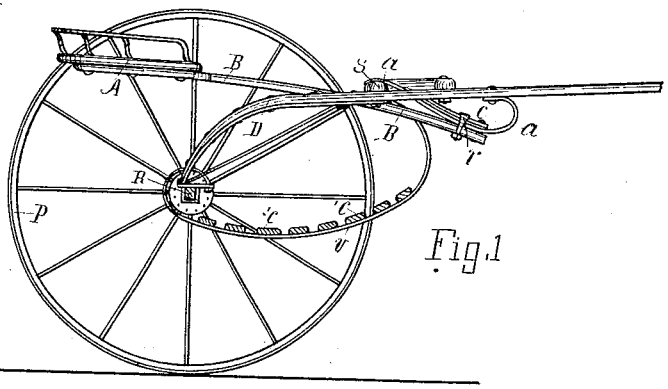
Figure 2:
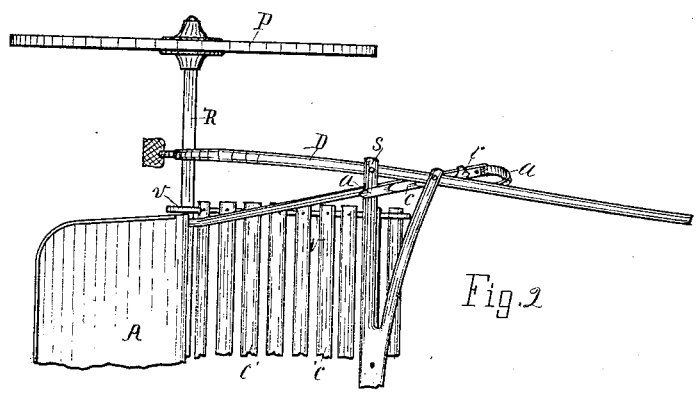

In the drawings, forming a part of this specification, Figure 1 is a side elevation with the wheel-axle in cross-section; and Fig. 2 is a top view of about one half of the cart, the other half being broken away.

The seat A is supported at the rear end of the ordinary seat-bars, B, suspended independent of the axle R. These bars are connected with the thills D by means of the peculiarly-formed springs $a$, which springs also support the seat-bars suspended over the axle, thus dispensing with the fulcrum heretofore employed. The spring $a$ is secured to the thill at one end, and from thence curves downward and rearward, onto the end of the seat-bar B, to which bar the spring is secured, and from this point the spring extends upward and rearward onto the cross-bar S of the thills. The spring may be bolted or otherwise secured to the cross-bar; but I prefer that it lie loosely upon it, to facilitate its spring action. One of these springs connects with each thill and seat-bar on both sides of the cart, Fig. 2 showing top view of one side.

The springs may be provided with leaves $c$, or not, according to the strength required. The springs may be bolted to the end of the seat-bars B; but I prefer to fasten them with bolts and an adjustable clip, $r$, by which means the degree of elasticity of the spring is controlled according to the weight of the rider. By moving the clip $r$ rearward from the point it occupies in Fig. 1 the spring would be stiffened.

Another feature of the invention is the peculiar form of the elastic bars $v$, which support the foot-slats $c'$. They are secured to the cross-bar $s$, and bow downward and rearward beneath the axle, and circle around the same, terminating in front of the axle, where the end is secured to a forwardly-extending plate fastened to the axle, Fig. 1. By this means the foot-support has a more free and a uniform elasticity throughout.

The use and advantages of this class of vehicles are well understood from the prior state of the art without further description here.

Having thus described my invention, what I claim as new, and desire to secure by Letters Patent, is—

1. In a two-wheeled vehicle, the combination of the thills, seat-bars, and the springs having their forward end attached to the thills and to the forward end of the seat-bars, from thence extending rearward and upward onto the thill cross-bar, substantially as set forth.

2. In a two-wheeled vehicle, the combination of the seat-bars, the thills, the springs having their forward end attached to the thills and to the forward end of the seat-bars, thence extending rearward and upward onto the thill cross-bar, and adjustable clips confining the springs and seat-bars at the rear of their point of attachment, substantially as set forth.

3. In a two-wheeled vehicle, the combination of the seat-bars and thills, and springs connecting the seat-bars with the thills and forming the only support to said bars, one end of said springs being secured to the thills, from thence extending downward and rearward onto the forward end of the seat-bars, where they are secured to said bars, thence upward and rearward onto the cross-bar of the thills, substantially as set forth.

4. The combination, with the thills and the axle provided with the forwardly-extended plates, of the elastic foot-rest bars, the rear ends thereof circling beneath and upwardly around the axle and secured to said plates, substantially as set forth.

In testimony of the foregoing I have hereunto subscribed my name in presence of two witnesses.

M. HENRY LANE.

Witnesses:
 J. BURTZHEIMER,
 JULIUS GOLDBURG.